(12) United States Patent
Joo et al.

(10) Patent No.: US 11,073,057 B2
(45) Date of Patent: Jul. 27, 2021

(54) CO CLEAN-UP CATALYST, AFTER TREATMENT SYSTEM AND AFTER TREATMENT METHOD

(71) Applicants: Hyundai Motor Company, Seoul (KR); KIA Motors Corporation, Seoul (KR)

(72) Inventors: Nahm Roh Joo, Gyeonggi-do (KR); Chang Hwan Kim, Gyeongi-do (KR); ChangHo Jung, Gyeonggi-do (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 16/263,537

(22) Filed: Jan. 31, 2019

(65) Prior Publication Data
US 2020/0248604 A1 Aug. 6, 2020

(51) Int. Cl.
*F01N 3/10* (2006.01)
*B01D 53/94* (2006.01)
(Continued)

(52) U.S. Cl.
CPC ......... *F01N 3/106* (2013.01); *B01D 53/9477* (2013.01); *F01N 3/101* (2013.01);
(Continued)

(58) Field of Classification Search
CPC .... F01N 3/2073; F01N 3/0814; F01N 3/0842; F01N 3/101; F01N 13/009; F01N 2570/14; F01N 3/2066; F01N 2240/25; F01N 2430/06; F01N 2610/02; F01N 13/107; F01N 3/035; F01N 3/2053; F01N 13/0093; F01N 13/04; F01N 2560/026; F01N 3/0807; F01N 3/103; F01N 3/106; F01N 11/00; F01N 11/002; F01N 13/008; F01N 13/0097; F01N 13/011; F01N 13/02; F01N 13/08; F01N 2240/36; F01N 2270/02; F01N 2370/04; F01N 2410/00; F01N 2410/12; F01N 2430/02; F01N 2560/021; F01N 2560/025; F01N 2560/14; F01N 2570/18; F01N 2610/03; F01N 2900/1602; F01N 2900/1624; F01N 3/0205; F01N 3/043; F01N 3/0821; F01N 3/0828; F01N 3/0878; F01N 3/208; F01N 3/2839; F01N 3/30;
(Continued)

(56) References Cited

U.S. PATENT DOCUMENTS 8,677,734 B2 * 3/2014 Ramanathan ......... F01N 3/0814
60/274
9,765,666 B2 * 9/2017 Smith ................... F01N 3/0814
(Continued)

*Primary Examiner* — Anthony Ayala Delgado
(74) *Attorney, Agent, or Firm* — Brinks Gilson & Lione

(57) ABSTRACT

An after treatment system is disclosed. The after treatment system may include a three-way catalyst (TWC), a selective catalytic reduction (SCR) catalyst, and a CO clean-up catalyst (CUC) on an exhaust pipe through which an exhaust gas flows. The CUC may include a zeolite in which Cu and Fe are ion-exchanged and $CeO_2$ in which Pt is supported, wherein a weight ratio of the $CeO_2$ to a total weight of the CUC is 30-70 wt % such that the CUC purifies $NH_3$ at a lean air/fuel ratio and purifies $NH_3$ during a delay time at a rich air/fuel ratio.

10 Claims, 15 Drawing Sheets

(51) Int. Cl.
*F01N 3/20* (2006.01)
*B01J 23/89* (2006.01)
*F01N 11/00* (2006.01)

(52) U.S. Cl.
CPC .......... *F01N 3/2066* (2013.01); *F01N 11/007* (2013.01); *B01D 2255/1021* (2013.01); *B01D 2255/2047* (2013.01); *B01D 2255/2063* (2013.01); *B01D 2255/2065* (2013.01); *B01D 2255/2066* (2013.01); *B01D 2255/20715* (2013.01); *B01D 2255/20738* (2013.01); *B01D 2255/20761* (2013.01); *B01D 2258/01* (2013.01); *B01J 23/894* (2013.01); *F01N 2370/04* (2013.01); *F01N 2900/0601* (2013.01); *F01N 2900/14* (2013.01)

(58) Field of Classification Search
CPC ... F01N 9/00; F01N 9/002; B01D 2251/2062; B01D 53/9418; B01D 2255/1025; B01D 2255/20723; B01D 2255/20738; B01D 2255/20761; B01D 2255/20776; B01D 2255/2065; B01D 2255/2092; B01D 2257/406; F02D 2200/0802; F02D 41/027; Y02A 50/2324; Y02A 50/2325; Y02A 50/2341

See application file for complete search history.

(56) References Cited

U.S. PATENT DOCUMENTS

| | | |
|---|---|---|
| 2007/0137187 A1* | 6/2007 | Kumar ................ F01N 13/0097 60/299 |
| 2009/0193796 A1* | 8/2009 | Wei ..................... F01N 13/0097 60/297 |
| 2010/0043402 A1 | 2/2010 | Perry et al. |
| 2010/0107605 A1* | 5/2010 | Brinkman .......... B01D 53/9477 60/274 |
| 2010/0139248 A1 | 6/2010 | Najt et al. |
| 2010/0212295 A1 | 8/2010 | Narayanaswamy et al. |
| 2010/0326052 A1 | 12/2010 | Sun |
| 2011/0202253 A1 | 8/2011 | Perry et al. |
| 2011/0288750 A1 | 11/2011 | Wermuth et al. |
| 2012/0060472 A1 | 3/2012 | Li et al. |
| 2017/0362984 A1* | 12/2017 | Li ........................... B01J 23/63 |

* cited by examiner

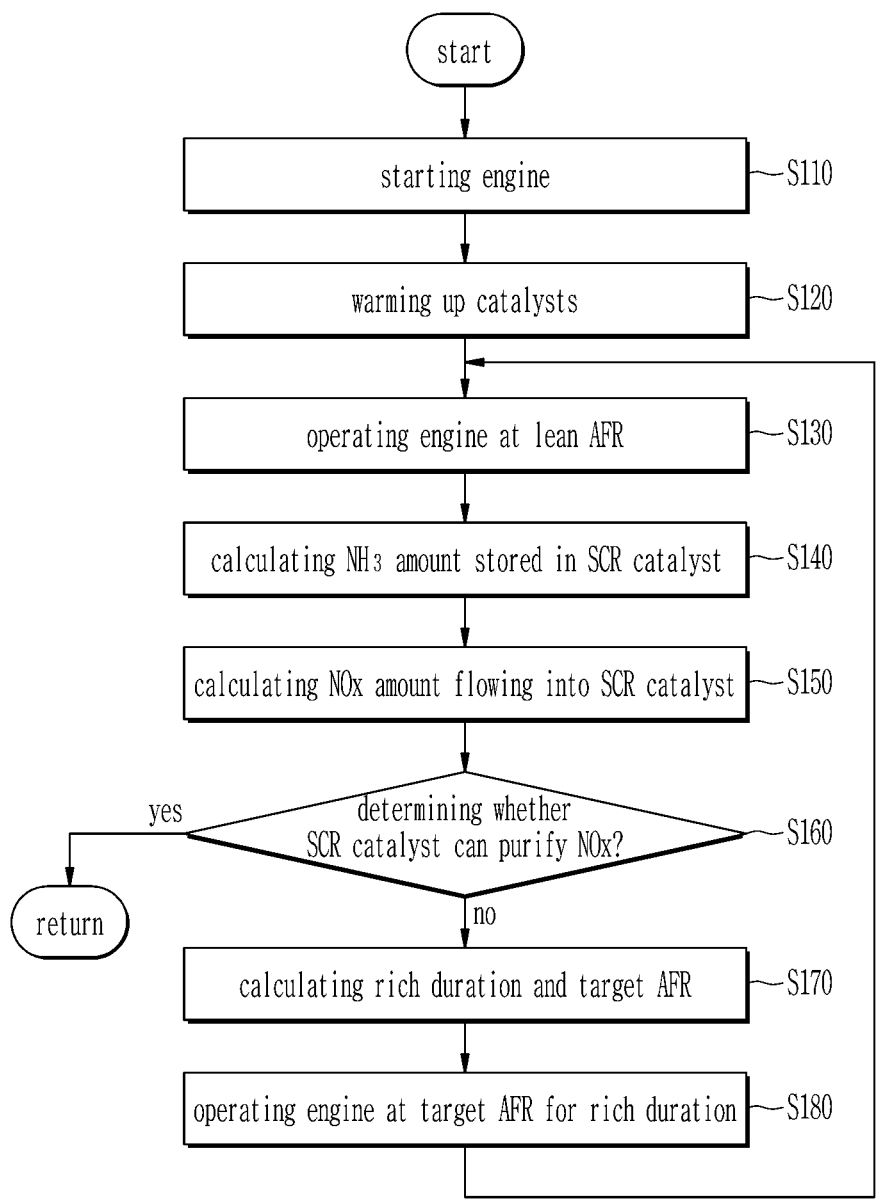

CO CLEAN-UP CATALYST, AFTER TREATMENT SYSTEM AND AFTER TREATMENT METHOD

FIELD

The present disclosure relates to a CO clean-up catalyst (CUC), an after treatment system and an after treatment method.

BACKGROUND

The statements in this section merely provide background information related to the present disclosure and may not constitute prior art.

Vehicles may be provided with at least one catalytic converter for reducing emission (EM) contained in an exhaust gas. The exhaust gas flowing out from an engine through an exhaust manifold is driven into a catalytic converter mounted at an exhaust pipe and is purified therein. After that, noise of the exhaust gas is decreased while passing through a muffler and then the exhaust gas is emitted into the air through a tail pipe. The catalytic converter purifies the EM contained in the exhaust gas. In addition, a particulate filter for trapping particulate matter (PM) in the exhaust gas is mounted in the exhaust pipe.

A three-way catalyst (TWC) is one type of the catalytic converter and reacts with hydrocarbon (HC) compounds, carbon monoxide (CO) and nitrogen oxides (NOx), which are harmful components of the exhaust gas, to remove these compounds. The TWCs are mainly installed in gasoline vehicles, and Pt/Rh, Pd/Rh or Pt/Pd/Rh systems are used as the TWCs.

A lean-burn engine among gasoline engines may improve fuel efficiency by burning a lean air/fuel mixture. The lean-burn engine burns the lean air/fuel mixture, so air/fuel ratio of the exhaust gas is also lean. However, when the air/fuel ratio is lean, the TWC slips the NOx without reducing all of the NOx contained in the exhaust gas. Accordingly, a vehicle equipped with the lean-burn engine further comprises a selective catalytic reduction (SCR) catalyst for purifying the NOx slipped from the TWC. The SCR catalyst used in the vehicle equipped with the lean-burn engine may be a passive type SCR catalyst.

When the air/fuel ratio is rich, the TWC reduces the NOx to produce NH3 and the NH3 generated in the TWC is stored in the passive type SCR catalyst. When the air/fuel ratio is lean, the passive type SCR catalyst purifies the NOx contained in the exhaust gas using the stored $NH_3$.

However, we have discovered that the TWC may slip CO at the rich air/fuel ratio. The CO sipped from the TWC may not be purified and be discharged to an outside of the vehicle. Therefore, an additional catalytic converter may be employed to purify the CO slipped from the TWC when the air/fuel ratio is adjusted to be rich for generating the $NH_3$.

Meanwhile, the passive type SCR catalyst can store the $NH_3$ and purify the NOx contained in the exhaust gas using the stored $NH_3$ when a temperature of the SCR catalyst is 200° C.-400° C., but may slip the $NH_3$ when the temperature of the SCR catalyst is above 400° C. The passive type SCR catalyst is disposed closed to the tail pipe considering temperature profile of the exhaust gas in the exhaust pipe, but the temperature of the passive type SCR catalyst rises up to 400° C. at high temperature/high load driving condition. Therefore, the passive type SCR catalyst does not purify but slips the $NH_3$.

In order to purify the $NH_3$ slipped from the passive type SCR catalyst, an ammonia oxidation catalyst (AOC) may be disposed on the exhaust pipe at a downstream of the SCR catalyst according to a conventional diesel engine. The AOC can oxidize the $NH_3$ slipped from the SCR catalyst into $N_2$ gas at the lean air/fuel ratio.

Since the diesel engine mainly operates at the lean air/fuel ratio and the $NH_3$ is slipped from the SCR catalyst at the lean air/fuel ratio, the AOC works well. However, since the $NH_3$ is slipped in the lean-burn gasoline engine at the rich air/fuel ratio, the conventional AOC cannot purify the slipped $NH_3$.

The above information disclosed in this Background section is only for enhancement of understanding of the background of the disclosure and therefore it may contain information that does not form the prior art that is already known to a person of ordinary skill in the art.

SUMMARY OF THE DISCLOSURE

The present disclosure describes a CO clean-up catalyst (CUC) having advantages of purifying CO slipped from a three-way catalyst (TWC) and purifying $NH_3$ contained in an exhaust gas during a delay time at a rich air/fuel ratio.

Another aspect of the present disclosure provides an after treatment system having further advantages of efficiently purifying emission contained in an exhaust gas by sequentially disposing the TWC, a selective catalytic reduction (SCR) catalyst, and the CUC on an exhaust pipe.

Another aspect of the present disclosure provides an after treatment method having further advantages of reducing the CO and the $NH_3$ discharged to an outside of a vehicle by efficiently controlling the after treatment system.

A CO clean-up catalyst (CUC) according to an form of the present disclosure may include a zeolite in which Cu and Fe are ion-exchanged and $CeO_2$ in which Pt is supported, wherein a weight ratio of the $CeO_2$ to a total weight of the CUC is 30-70 wt % such that the CUC purifies $NH_3$ at a lean air/fuel ratio and purifies $NH_3$ during a delay time at a rich air/fuel ratio.

The CUC may include 0.04-0.4 wt % of the Pt, 0.2-1 wt % of the Cu, 0.2-1 wt % of the Fe, 20-50 wt % of the zeolite, 30-70 wt % of the $CeO_2$, and 0-20 wt % of an additive based on the total weight of the CUC.

The additive may include at least one of La, Zr, Mg, and Pr.

An after treatment system according to another form of the present disclosure may include: an exhaust pipe through which an exhaust gas flows; a three-way catalyst (TWC) mounted on the exhaust pipe, oxidizing HC and CO contained in the exhaust gas at a lean air/fuel ratio, and generating $NH_3$ using NOx contained in the exhaust gas at a rich air/fuel ratio; a selective catalytic reduction (SCR) catalyst mounted on the exhaust pipe at a downstream of the TWC, storing the $NH_3$ generated in the TWC, and reducing the NOx contained in the exhaust gas using the stored $NH_3$; and a CO clean-up catalyst (CUC) mounted on the exhaust pipe at a downstream of the SCR catalyst, purifying the $NH_3$ contained in the exhaust gas at the lean air/fuel ratio, purifying the CO slipped from the TWC or contained in the exhaust gas at the rich air/fuel ratio, and purifying the $NH_3$ contained in the exhaust gas during a delay time at the rich air/fuel ratio.

The after treatment system may further include a particulate filter disposed between the TWC and the SCR catalyst, wherein the particulate filter traps particulate matter in the exhaust gas.

The after treatment system may further include an additional TWC or an ammonia production catalyst (APC) disposed between the TWC and the SCR catalyst, wherein the additional TWC or the APC further generates $NH_3$ using the NOx contained in the exhaust gas at the rich air/fuel ratio.

In one aspect, the APC may include 0.4-0.9 wt % of Pt, 0.057-0.3 wt % of Pd, 0.03-0.1 wt % of Rh, 5.0-15.0 wt % of Ba, 10-30 wt % of $CeO_2$, 48.7-84.513 wt % of a composite of MgO and $Al_2O_3$, and 0-5 wt % of an additive based on a total weight of the APC.

In another aspect, the APC may include 0.4-0.9 wt % of Pt, 0.057-0.3 wt % of Pd, 0.03-0.1 wt % of Rh, 5.0-15.0 wt % of Ba, 10-25 wt % of $CeO_2$, 48.7-79.513 wt % of a composite of MgO and $Al_2O_3$, and 0-10 wt % of an additive based on a total weight of the APC.

T lean NOx trap (LNT) catalyst may be further coated in the TWC or the additional TWC, wherein the LNT catalyst absorbs the NOx contained in the exhaust gas at the lean air/fuel ratio, and releases and reduces the absorbed NOx into $N_2$ gas or the $NH_3$ at the rich air/fuel ratio.

The CUC comprises a zeolite in which Cu and Fe are ion-exchanged and $CeO_2$ in which Pt is supported, wherein a weight ratio of the $CeO_2$ to a total weight of the CUC is 30-70 wt %.

The CUC may include 0.04-0.4 wt % of the Pt, 0.2-1 wt % of the Cu, 0.2-1 wt % of the Fe, 20-50 wt % of the zeolite, 30-70 wt % of the $CeO_2$, and 0-20 wt % of an additive based on the total weight of the CUC.

The additive may include at least one of La, Zr, Mg, and Pr.

In one aspect, the CUC may be formed by uniformly mixing the zeolite in which the Cu and the Fe are ion-exchanged and the $CeO_2$ in which the Pt is supported.

In another aspect, the zeolite in which the Cu and the Fe are ion-exchanged may be disposed at a front end portion of the CUC and the $CeO_2$ in which the Pt is supported may be disposed at a rear end portion of the CUC in a direction to which the exhaust gas flows.

In other aspect, the CUC may be formed by stacking up the zeolite in which the Cu and the Fe are ion-exchanged and the $CeO_2$ in which the Pt is supported in a vertical direction to which the exhaust gas flows.

An after treatment method according to another form of the present disclosure is configured to control an after treatment system equipped with a three-way catalyst (TWC), a selective catalytic reduction (SCR) catalyst, and a CO clean-up catalyst (CUC) on an exhaust pipe through which an exhaust gas flows, wherein the CUC includes a zeolite in which Cu and Fe are ion-exchanged and $CeO_2$ in which Pt is supported, and wherein a weight ratio of the $CeO_2$ to a total weight of the CUC is 30-70 wt % such that the CUC purifies $NH_3$ at a lean air/fuel ratio and purifies $NH_3$ during a delay time at a rich air/fuel ratio.

The after treatment method may include: operating an engine at a lean air/fuel ratio; calculating an amount of $NH_3$ stored in the SCR catalyst; calculating an amount of NOx which will flow into the SCR catalyst; determining whether conversion to the rich air/fuel ratio is desirable or necessary; calculating, when the conversion to the rich air/fuel ratio is desirable or necessary, a rich duration for which the rich air/fuel ratio is maintained and a target air/fuel ratio; and operating the engine at the target air/fuel ratio for the rich duration.

The rich duration may be calculated according to the target air/fuel ratio and a temperature of the CUC.

The rich duration may be calculated such that a slip amount of the NH3 accumulated at a downstream of the CUC during the rich duration is smaller than or equal to a predetermined value if the engine is operated at the target air/fuel ratio during the rich duration.

The CUC may include 0.04-0.4 wt % of the Pt, 0.2-1 wt % of the Cu, 0.2-1 wt % of the Fe, 20-50 wt % of the zeolite, 30-70 wt % of the $CeO_2$, and 0-20 wt % of an additive based on the total weight of the CUC.

The additive may include at least one of La, Zr, Mg, and Pr.

According to forms of the present disclosure, the CO slipped from the TWC when the air/fuel ratio is adjusted to be rich for generating the $NH_3$ and the $NH_3$ slipped from the SCR catalyst when a temperature of the SCR catalyst is higher than or equal to a predetermined temperature may be purified by disposing the CUC at a rear end portion of the after treatment system.

In addition, since the rich duration can be adjusted according to the temperature of the CUC and the target air/fuel ratio, it is possible to increase or maximize $NH_3$ generation while reducing the CO and the $NH_3$ discharged to the outside of the vehicle.

In addition, other effects of the forms of the present disclosure should be directly or implicitly described in the description provided herein. Various effects predicted according to the forms of the present disclosure will be disclosed in the description provided herein.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 15 is a flowchart of an after treatment method according to an form of the present disclosure.

Figure 1:
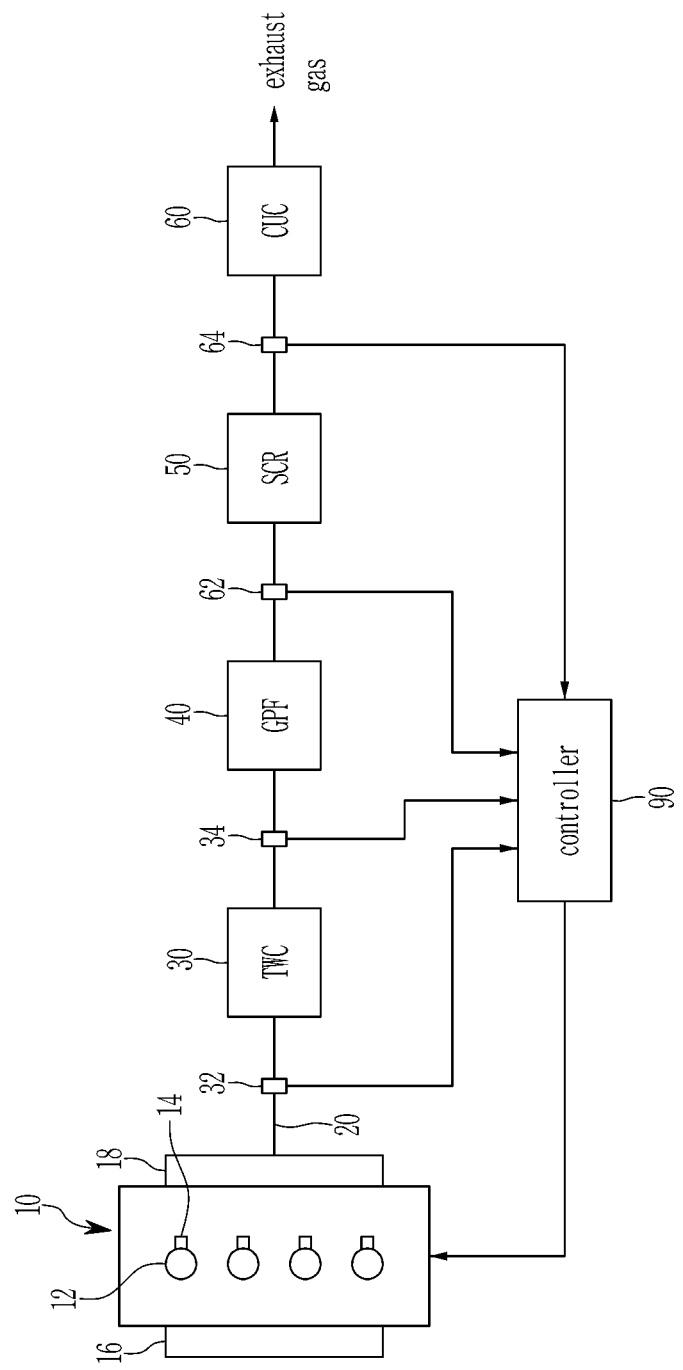
FIG. 1 is a schematic diagram of an after treatment system according to an form of the present disclosure.

It should be understood that the above-referenced drawings are not necessarily to scale, presenting a somewhat simplified representation of various features illustrative of the basic principles of the disclosure. The specific design features of the present disclosure, including, for example, specific dimensions, orientations, locations, and shapes, will be determined in part by the particular intended application and use environment.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

The terminology used herein is not intended to be limiting of the present disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. The term "coupled" denotes a physical relationship between two components whereby the components are either directly connected to one another or indirectly connected via one or more intermediary components.

It is understood that the term "vehicle," "vehicular," "car," or other similar term as used herein is inclusive of motor vehicles, in general, such as passenger automobiles including sports utility vehicles (SUV), buses, trucks, various commercial vehicles, watercraft including a variety of boats and ships, aircraft, and the like, and includes hybrid vehicles, electric vehicles, hybrid electric vehicles, hydrogen-powered vehicles and other alternative fuel vehicles (e.g., fuels derived from resources other than petroleum).

Additionally, it is understood that one or more of the below methods, or aspects thereof, may be executed by at least one controller. The term "controller" may refer to a hardware device that includes a memory and a processor. The memory is configured to store program instructions, and the processor is specifically programmed to execute the program instructions to perform one or more processes which are described further below. Moreover, it is understood that the below methods may be executed by a system comprising the controller, as described in detail below.

Furthermore, the controller of the present disclosure may be embodied as non-transitory computer readable media containing executable program instructions executed by a processor or the like. Examples of the computer readable mediums include, but are not limited to, ROM, RAM, compact disc (CD)-ROMs, magnetic tapes, floppy disks, flash drives, smart cards, and optical data storage devices. The computer readable recording medium can also be distributed throughout a computer network so that the program instructions are stored and executed in a distributed fashion, e.g., by a telematics server or a Controller Area Network (CAN).

Hereinafter, forms of the present disclosure will be described in detail with reference to the accompanying drawings.

FIG. 1 is a schematic diagram of an after treatment system according to an form of the present disclosure.

As shown in FIG. 1, an after treatment system according to an form of the present disclosure includes an engine 10, an exhaust pipe 20, a three-way catalyst (TWC) 30, a particulate filter (GPF) 40, a selective catalytic reduction (SCR) catalyst 50, and a CO clean-up catalyst (CUC) 60.

The engine 10 burns an air/fuel mixture to convert chemical energy into mechanical energy. The engine 10 is connected to an intake manifold 16 to flow air into a combustion chamber 12. An exhaust gas generated in combustion process is collected in an exhaust manifold 18 and then flows out from the engine 10. The combustion chamber 12 is equipped with a spark plug 14 to ignite the air/fuel mixture within the combustion chamber 12. The engine 10 may be a gasoline engine. Depending on types of gasoline engines, fuel may be directly injected into the combustion chamber 12 or the air/fuel mixture may be supplied to the combustion chamber 12 via the intake manifold 16.

The exhaust pipe 20 is connected to the exhaust manifold 18 to discharge the exhaust gas to an outside of the vehicle. The exhaust pipe 20 is equipped with the TWC 30, the particulate filter 40, the SCR catalyst 50, and the CUC 60 to purify or remove emission and particulate matter contained in the exhaust gas.

The TWC 30 is disposed on the exhaust pipe 20 through which the exhaust gas discharged from the engine 10 flows, and harmful materials including CO, HC, and NOx contained in the exhaust gas are converted into harmless components by an oxidation-reaction reaction in the TWC 30. Particularly, the TWC 30 can reduce the NOx contained in the exhaust gas into $NH_3$ at a rich air/fuel ratio (AFR). At this time, the TWC 30 may not purify the CO in the exhaust gas sufficiently and may slip the CO therefrom. In addition, the TWC 30 oxidizes the CO and the HC contained in the exhaust gas at a lean AFR. Since the TWC 30 is well known to a person of an ordinary skill in the art, a detailed description thereof will be omitted.

The particulate filter 40 is mounted on the exhaust pipe 20 at a downstream of the TWC 30, traps the particulate matter contained in the exhaust gas, and burns the trapped particulate matter. The particulate filter 40 is provided with inlet cells and outlet cells alternately disposed in a housing, and a wall is disposed between the inlet cell and the outlet cell. The inlet cell has an end that is opened and the other end that is blocked, and the outlet cell has an end that is blocked and the other end that is opened. The exhaust gas flows into the particulate filter 40 through the opened end of the inlet cell, flows to the outlet cell through the wall, and flows out to an outside of the particulate filter 40 through the opened end of the outlet cell. When the exhaust gas passes through the wall, the particulate filter contained in the exhaust gas does not pass through the wall and remains in the inlet cell.

The SCR catalyst 50 is mounted on the exhaust pipe 20 at a downstream of the particulate filter 40. The SCR catalyst 50 stores the $NH_3$ generated in the TWC 30 at the rich AFR and reduces the NOx contained in the exhaust gas using the stored $NH_3$ at the lean AFR. This type of the SCR catalyst 50 may be referred to as a passive type SCR catalyst 50.

The SCR catalyst 50 may be composed of one or a combination of a zeolite catalyst and a metal catalyst supported in a porous $Al_2O_3$. At least one of Cu, Pt, Mn, Fe, Co, Ni, Zn, Cs and Ga may be ion-exchanged in the zeolite catalyst. In the metal catalyst supported in the porous $Al_2O_3$, at least one metal among Pt, Pd, Rh, Ir, Ru, W, Cr, Mn, Fe, Co, Cu, Zn and Ag may be supported in the porous $Al_2O_3$.

The CUC 60 is mounted on the exhaust pipe 20 at a downstream of the SCR catalyst 50. The CUC 60 purifies the CO contained in the exhaust gas. Particularly, when the AFR is rich, the CO can be slipped from the TWC 30, and the CUC 60 is mounted at the rear end portion of the after treatment system to prevent or inhibit the CO from discharging to the outside of the vehicle. Also, the CUC 60 oxidizes the $NH_3$ contained in the exhaust gas into $N_2$ gas at the lean AFR. Further, the CUC 60 can purify the $NH_3$ contained in the exhaust gas during a delay time at the rich AFR. Therefore, the CUC 60 can purify during the delay time the $NH_3$ slipped from the SCR catalyst 50 at high temperature/high load condition. The delay time relates to an amount of an oxygen storage material included in the CUC 60.

The CUC 60 includes a zeolite in which Cu and Fe are ion-exchanged and $CeO_2$ in which Pt is supported. In addition, the zeolite further includes Pt ion-exchanged therein. In more detail, the CUC 60 includes 0.04-0.4 wt % of the Pt, 0.2-1 wt % of the Cu, 0.2-1 wt % of the Fe, 20-50 wt % of the zeolite, 30-70 wt % of the $CeO_2$, and 0-20 wt % of an additive based on the total weight of the CUC.

The additive is added for improving performance of the $CeO_2$ and includes at least one of La, Zr, Mg and Pr.

The CUC 60 is mainly composed of Pt—$CeO_2$ and Cu/Fe-zeolite. Here, Pt functions to oxidize the CO and the $NH_3$, and the $CeO_2$ contains the oxygen storage material so that the $CeO_2$ helps to oxidize the CO and the $NH_3$ at a low temperature at the rich AFR. For this purpose, the $CeO_2$ may be between 30-70 wt %, inclusive, of a total weight of the CUC 60. In addition, the Cu/Fe-zeolite oxidizes the $NH_3$ into the $N_2$ gas at the lean AFR.

Figure 7:
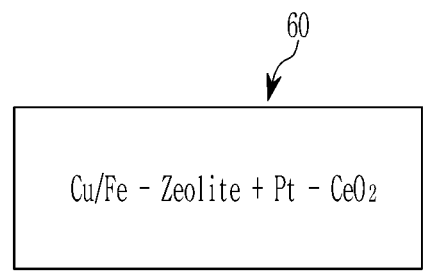
FIG. 7 illustrates one form of a CUC according to an form of the present disclosure.
Figure 8:
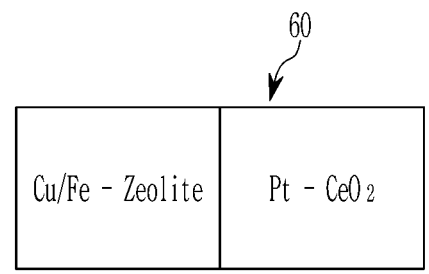
FIG. 8 illustrates another form of a CUC according to an form of the present disclosure.
Figure 9:
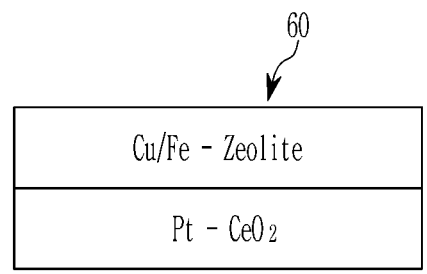
FIG. 9 illustrates other form of a CUC according to an form of the present disclosure.
Figure 10:
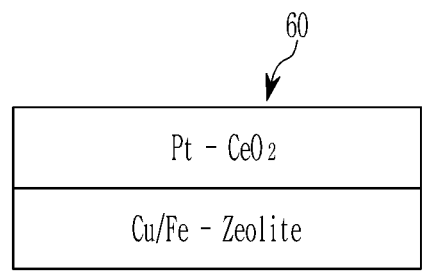
FIG. 10 illustrates other form of a CUC according to an form of the present disclosure.

The CUC 60 can be formed in various forms. In one form, as shown in FIG. 7, the CUC 60 is formed by uniformly mixing the zeolite in which the Cu and the Fe are ion-exchanged and the $CeO_2$ in which the Pt is supported. In another form, as shown in FIG. 8, the zeolite in which the Cu and the Fe are ion-exchanged is disposed at a front end portion of the CUC 60 and the $CeO_2$ in which the Pt is supported is disposed at a rear end portion of the CUC 60 in a direction to which the exhaust gas flows. In other form, as shown in FIG. 9, the CUC 60 is formed by sequentially stacking up the zeolite in which the Cu and the Fe are ion-exchanged and the $CeO_2$ in which the Pt is supported in a vertical direction to which the exhaust gas flows. In other form, as shown in FIG. 10, the CUC 60 is formed by sequentially stacking up the $CeO_2$ in which the Pt is supported and the zeolite in which the Cu and the Fe are ion-exchanged in the vertical direction to which the exhaust gas flows.

The exhaust pipe 20 may be equipped with a plurality of sensors 32, 34, 62, and 64 for detecting the AFR of the exhaust gas and operation of the catalysts 30, 40, 50 and 60.

A first oxygen sensor 32 is mounted on the exhaust pipe 20 at an upstream of the TWC 30, detects O2 concentration in the exhaust gas at the upstream of the TWC 30, and transmits a signal corresponding thereto to a controller 90.

A second oxygen sensor 34 is mounted on the exhaust pipe 20 at the downstream of the TWC 30, detects O2 concentration in the exhaust gas at the downstream of the TWC 30, and transmits a signal corresponding thereto to the controller 90.

A first temperature sensor 62 is mounted on the exhaust pipe 20 at an upstream of the SCR catalyst 50, detects a temperature of the exhaust gas at the upstream of the SCR catalyst 50, and transmits a signal corresponding thereto to the controller 90.

A second temperature sensor 64 is mounted on the exhaust pipe 20 at the downstream of the SCR catalyst 50, detects the temperature of the exhaust gas at the downstream of the SCR catalyst 50, and transmits a signal corresponding thereto to the controller 90.

Figure 14:
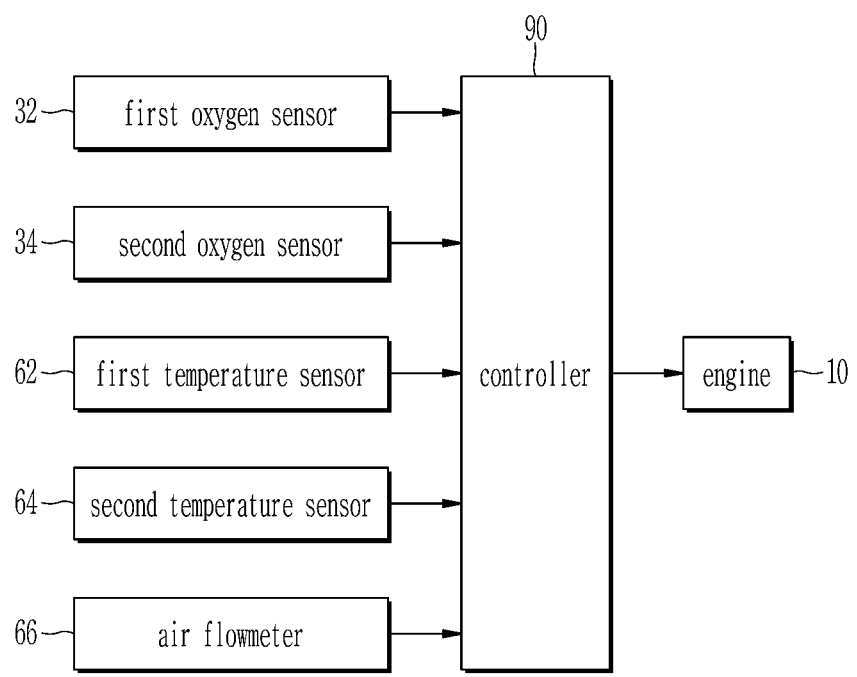
FIG. 14 is a block diagram of an after treatment system according to an form of the present disclosure.

In addition to the sensors 32, 34, 62, and 64 described herein, the after treatment system may further include various sensors. For example, additional temperature sensors can be mounted on the exhaust pipe 20 at the upstream and the downstream of the TWC 30 to detect the temperature of the exhaust gas at the upstream and the downstream of the TWC 30, respectively. In addition, as shown in FIG. 14, the after treatment system may further include an air flowmeter 66. Further, the after treatment system may further include a NOx sensor, an HC sensor or a CO sensor mounted on the exhaust pipe 20, and concentration of emission contained in the exhaust gas can be detected via these sensors.

The controller 90 is electrically connected to the sensors 32, 34, 62, 64 and 66 to receive the signals corresponding to the detected values by the sensors 32, 34, 62, 64 and 66, and determines driving condition of the vehicle, the AFR, and the temperatures of the catalysts 30, 40, 50, and 60 based on the signals. The controller 90 can control ignition timing, fuel injection timing, fuel amount, etc., by controlling the engine 10 based on the determination results. The controller 90 may be implemented with at least one processor executed by a predetermined program and the predetermined program may be programmed to perform each step of an after treatment method according to an form of the present disclosure.

Figure 2:
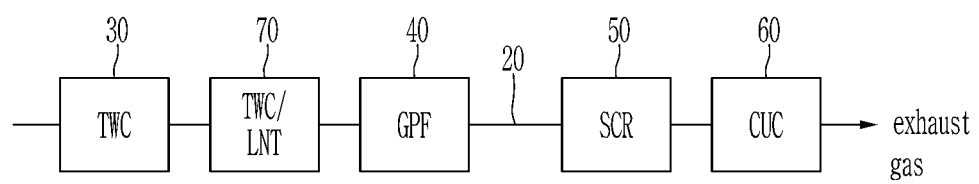
FIG. 2 is a schematic diagram of an after treatment system according to another form of the present disclosure.

FIG. 2 is a schematic diagram of an after treatment system according to another form of the present disclosure. The after treatment system shown in FIG. 2 is a modification of the after treatment system shown in FIG. 1.

As shown in FIG. 2, the after treatment system according to another form of the present disclosure is equipped with the TWC 30, an additional TWC 70, the particulate filter 40, the SCR catalyst 50, and the CUC 60 sequentially disposed on the exhaust pipe 20. Since the TWC 30, the particulate filter 40, the SCR catalyst 50, and the CUC 60 are described above, a detailed description thereof will be omitted.

The additional TWC 70 is disposed on the exhaust pipe 20 between the TWC 30 and the particulate filter 40. The additional TWC 70 basically performs the same function as the TWC 30. In other words, the additional TWC 70 converts harmful materials including the CO, the HC, and the NOx contained in the exhaust gas into harmless components by oxidation-reaction reaction. In addition, the additional TWC 70 increases the amount of $NH_3$ supplied to the SCR catalyst 50 by reducing the NOx contained in the exhaust gas into $NH_3$ when the AFR is rich. In addition, a lean NOx trap (LNT) catalyst may be further coated in the additional TWC 70 and the TWC 30. The LNT catalyst absorbs the NOx at the lean AFR, and releases the absorbed NOx and reduces the released NOx into the $N_2$ gas or the $NH_3$ at the rich AFR. Thus, the LNT catalyst assists the TWC having low NOx purification performance at the lean AFR. The LNT catalyst includes at least one or a combination of an alkali metal including K, Na, Li, and Cs, an alkaline earth metal including Ba and Ca, a rare earth metal including Ir and La, and a noble metal including Pt, Pd, and Rh.

Figure 3:
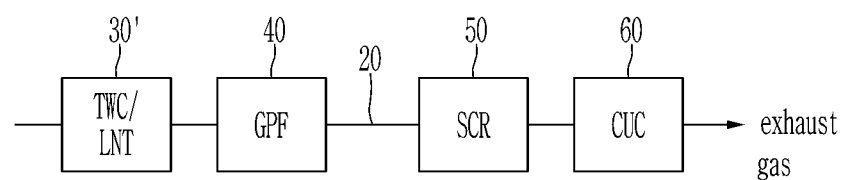
FIG. 3 is a schematic diagram of an after treatment system according to other form of the present disclosure.

FIG. 3 is a schematic diagram of an after treatment system according to other form of the present disclosure. The after treatment system shown in FIG. 3 uses a TWC 30' coated with the LNT catalyst instead of the TWC 30 in the after treatment system shown in FIG. 1. Since the after treatment system shown in FIG. 1 and the TWC 30' coated with the LNT catalyst are described above, a detailed description thereof will be omitted.

Figure 4:
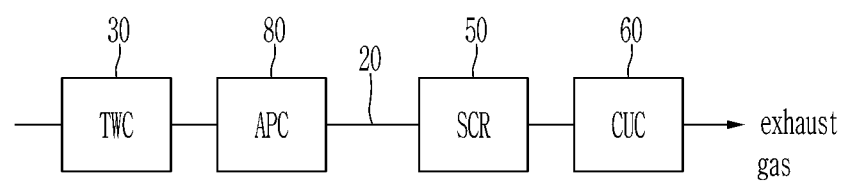
FIG. 4 is a schematic diagram of an after treatment system according to other form of the present disclosure.

FIG. 4 is a schematic diagram of an after treatment system according to other form of the present disclosure. The after treatment system shown in FIG. 4 is a modification of the after treatment system shown in FIG. 1.

As shown in FIG. 4, the after treatment system according to other form of the present disclosure is equipped with the TWC 30, an ammonia production catalyst (APU) 80, the SCR catalyst 50, and the CUC 60 sequentially disposed on the exhaust pipe 20. Since the TWC 30, the SCR catalyst 50, and the CUC 60 are described above, a detailed description thereof will be omitted.

The APC 80 is disposed at the exhaust pipe 20 at the downstream of the TWC 30. The APC 80 stores the NOx contained in the exhaust gas at the lean AFR, and generates $H_2$ to release the stored NOx and generates $NH_3$ using the released NOx and the generated $H_2$.

In one aspect, the APC 80 includes 0.4-0.9 wt % of Pt, 0.057-0.3 wt % of Pd, 0.03-0.1 wt % of Rh, 5.0-15.0 wt % of Ba, 10-30 wt % of $CeO_2$, 48.7-84.513 wt % of a composite of MgO and $Al_2O_3$, and 0-5 wt % of an additive based on a total weight of the APC 40.

In another aspect, the APC 80 includes 0.4-0.9 wt % of Pt, 0.057-0.3 wt % of Pd, 0.03-0.1 wt % of Rh, 5.0-15.0 wt % of Ba, 10-25 wt % of $CeO_2$, 48.7-79.513 wt % of the composite of MgO and $Al_2O_3$, and 0-10 wt % of the additive based on the total weight of the APC.

The additive is added for the performance improvement of $CeO_2$ and $Al_2O_3$ and includes at least one of La, Zr, Mg and Pr.

The Pt contained in the APC 80 functions to oxidize the NOx for the APC 80 to store the NOx. In addition, the Pt increases an amount of $H_2$ generated in the APC 80.

The Pd contained in the APC 80 improves heat resistance of the APC 80. Since the APC 80 is disposed close to the engine 10, a temperature of the APC 80 can rise to 950° C. Therefore, the Pd is added in the APC 80 to improve heat resistance.

In order to increase the $NH_3$ generation and the $H_2$ generation, a weight ratio of the Pt to the Pd in the APC 80 may be 3:1-7:1. In one aspect, the weight ratio of the Pt to the Pd in the APC 80 may be 3:1-5:1.

The Rh contained in the APC 80 purifies the NOx contained in the exhaust gas at a stoichiometric AFR.

The Ba and the $CeO_2$ contained in the APC 80 is configured to store the NOx in nitrate form.

In addition, the $CeO_2$ increases $H_2$ generation. However, if the APC 80 contains large amounts of the $CeO_2$, the generated $NH_3$ can be reoxidized. Thus, the APC 80 may include 10-30 wt % of $CeO_2$ based on a total weight of the APC 80.

The composite of MgO and $Al_2O_3$ contained in the APC 80 functions as a substrate. The composite of MgO and $Al_2O_3$ may include 15-25 wt % of MgO based on a total weight of the composite of MgO and $Al_2O_3$. The MgO enhances thermal stability of the Ba.

Figure 5:
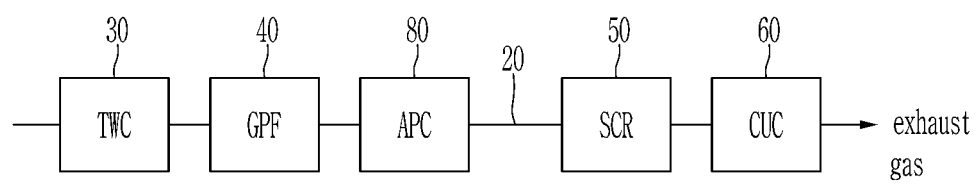
FIG. 5 is a schematic diagram of an after treatment system according to other form of the present disclosure.

FIG. 5 is a schematic diagram of an after treatment system according to other form of the present disclosure. The after treatment system shown in FIG. 5 is a modification of the after treatment system shown in FIG. 4.

As shown in FIG. 5, the after treatment system according to other form of the present disclosure is equipped with the TWC 30, the particulate filter 40, the APC 80, the SCR catalyst 50, and the CUC 60 sequentially disposed on the exhaust pipe 20. Since the TWC 30, the particulate filter 40, the APC 80, the SCR catalyst 50, and the CUC 60 are described above, a detailed description thereof will be omitted.

Figure 6:
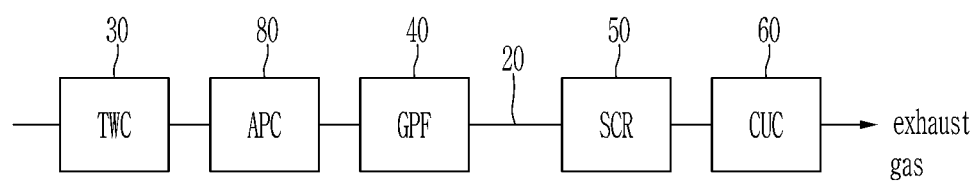
FIG. 6 is a schematic diagram of an after treatment system according to other form of the present disclosure.

FIG. 6 is a schematic diagram of an after treatment system according to other form of the present disclosure. The after treatment system shown in FIG. 6 is a modification of the after treatment system shown in FIG. 4.

As shown in FIG. 6, the after treatment system according to other form of the present disclosure is equipped with the TWC 30, the APC 80, the particulate filter 40, the SCR catalyst 50, and the CUC 60 sequentially disposed on the exhaust pipe 20. Since the TWC 30, the APC 80, the particulate filter 40, the SCR catalyst 50, and the CUC 60 are described above, a detailed description thereof will be omitted.

According to the forms of the present disclosure, catalysts (e.g., the TWC, the additional TWC, the LNT, the APC, etc.) which can generate the $NH_3$ at the rich AFR is disposed at a front end portion of the after treatment system, the SCR catalyst which stores the $NH_3$ and purifies the NOx using the stored $NH_3$ is disposed at a middle portion of the after treatment system, and the CUC is disposed at the rear end portion of the after treatment system. Therefore, purifying performance for the emissions contained in the exhaust gas can be improved.

Examples

Hereinafter, the performance of the CUC 60 will be described through various examples and comparative examples. The compositions of various examples and comparative examples are shown in [Table 1].

TABLE 1

|  | Pt(wt %) | Cu(wt %) | Fe(wt %) | Zeolite(wt %) | $CeO_2$(wt %) | additive (wt %) |
|---|---|---|---|---|---|---|
| Example 1 | 0.3 | 0.5 | 0.5 | 40 | 50 | 8.7 |
| Comparative Example 1 | 0.1 | 1 | 1 | 80 | 0 | 17.9 |
| Comparative Example 2 | 0.2 | 0 | 0 | 0 | 80 | 19.8 |

Test Method

The TWC 30 and the CUC 60 are sequentially disposed on the exhaust pipe 20, and 2.0 L, 4-cylinders, lean-burn gasoline engine is connected to the exhaust pipe 20 for aging treatment. The aging treatment is carried out for 50 hours at 1,000° C. on the TWC 30 basis and 700° C. on the CUC 60 basis.

The aged CUC 60 is cut to 1-inch diameter and 1-inch length to create a CUC sample, and the CUC sample is connected to a lean-rich gas supply device. The lean-rich gas supply device is a device that supplies gas with composition similar to the exhaust gas composition at the downstream of the SCR catalyst 50.

While the concentration of the $NH_3$ contained in the gas is maintained to be 10 ppm using the lean-rich gas supply device, the AFR is kept rich ($\lambda$=0.97) for 15 seconds after being kept lean ($\lambda$=2.0) for 15 seconds. At this time, the concentrations of $N_2O$, the NOx, and the NH3 contained in the gas are measured at the downstream of the CUC 60. At this time, the temperature of the CUC 60 is adjusted to 250° C.

Figure 11:
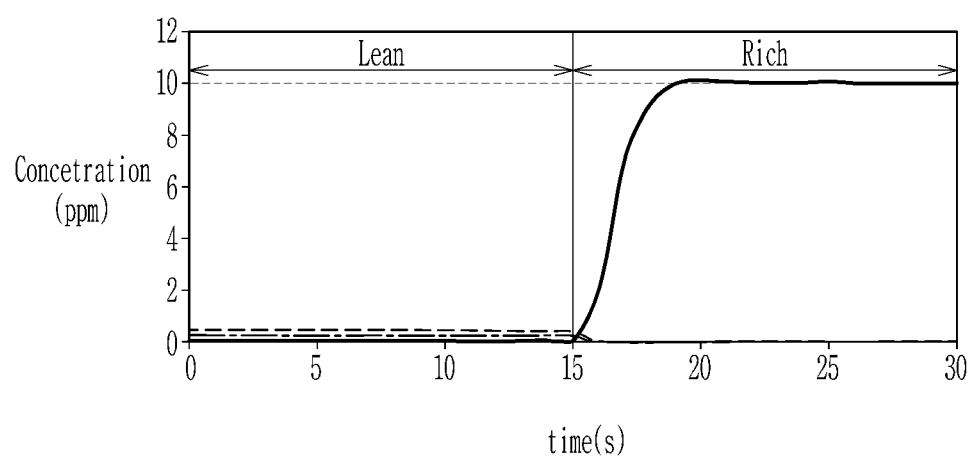
FIG. 11 is a graph illustrating concentrations of nitrous oxide, NOx and NH3 contained in the exhaust gas at a downstream of a CUC in Comparative Example 1 when the engine is operated at a lean air/fuel ratio and a rich air/fuel ratio.
Figure 12:
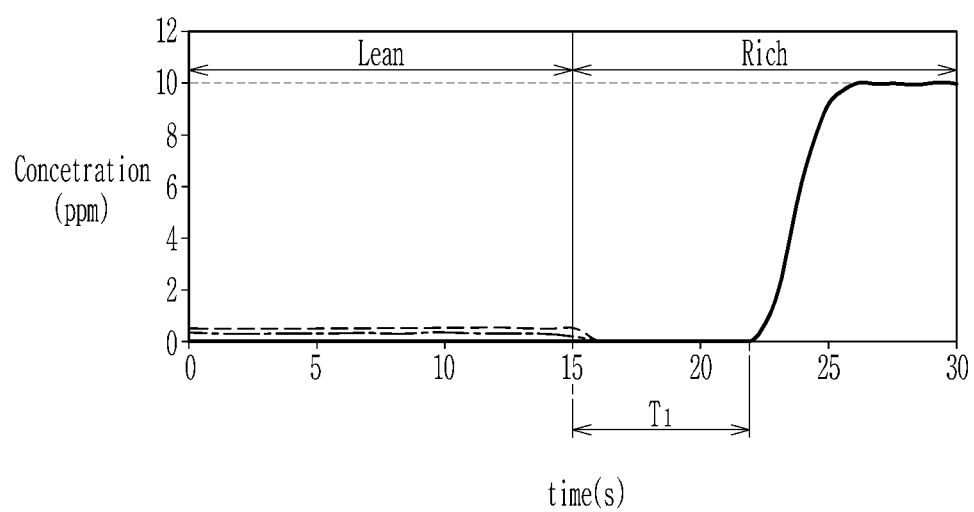
FIG. 12 is a graph illustrating concentrations of nitrous oxide, NOx and NH3 contained in the exhaust gas at a downstream of a CUC in Example 1 when the engine is operated at a lean air/fuel ratio and a rich air/fuel ratio.

FIG. 11 is a graph illustrating concentrations of nitrous oxide, NOx and NH3 contained in the exhaust gas at a downstream of a CUC in Comparative Example 1 when the engine is operated at a lean air/fuel ratio and a rich air/fuel ratio; FIG. 12 is a graph illustrating concentrations of nitrous oxide, NOx and NH3 contained in the exhaust gas at a downstream of a CUC in Example 1 when the engine is operated at a lean air/fuel ratio and a rich air/fuel ratio; and FIG. 13 is a graph illustrating concentrations of nitrous oxide, NOx and NH3 contained in the exhaust gas at a downstream of a CUC in Comparative Example 2 when the engine is operated at a lean air/fuel ratio and a rich air/fuel ratio.

Figure 13:
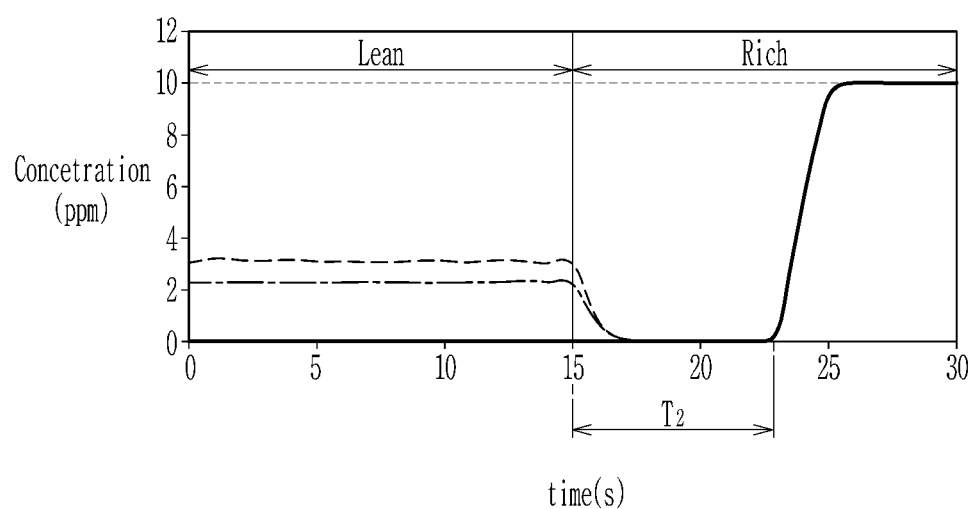
FIG. 13 is a graph illustrating concentrations of nitrous oxide, NOx and NH3 contained in the exhaust gas at a downstream of a CUC in Comparative Example 2 when the engine is operated at a lean air/fuel ratio and a rich air/fuel ratio.

In FIG. 11 to FIG. 13, a dotted line represents the concentration of the $N_2O$, an alternated long and short dash line represents the concentration of the NOx, and a solid line represents the concentration of the $NH_3$.

As shown in FIG. 11, Comparative Example 1 contains only Pt/Cu/Fe-zeolite, which sufficiently oxidizes the NH3 at the lean AFR. Since the concentrations of the $N_2O$ the NOx are low at the lean AFR, it can be known that the $NH_3$ is oxidized into $N_2$ gas. However, since Comparative Example 1 does not contain the Pt—$CeO_2$, Comparative Example 1 does not oxidize but slips the $NH_3$ to the downstream of the CUC 60 at the rich AFR.

As shown in FIG. 12, since Example 1 contains the Cu/Fe-zeolite and the Pt—$CeO_2$, Example 1 sufficiently oxidizes the $NH_3$ at the lean AFR and can oxidize the $NH_3$ during a delayed time T1 at the rich AFR. Since the concentrations of the $N_2O$ the NOx are low at the lean AFR, it can be known that the $NH_3$ is oxidized into $N_2$ gas. Also, the $NH_3$ does not slip during the delay time T1 at the rich AFR, but the $O_2$ stored in the oxygen storage material of the CUC 60 is purged, and thus, the $NH_3$ begins to slip when the delay time T1 elapses. Therefore, if a rich duration during which the engine operates at the rich AFR is set to be equal to or slightly greater than the delay time T1, the amount of the $NH_3$ slipped from the CUC 60 may be less than a regulated value. The delay time T1 is about 7 to 8 seconds.

As shown in FIG. 13, since Comparative Example 2 contains only the Pt—$CeO_2$, Comparative Example 2 sufficiently oxidizes the $NH_3$ at the lean AFR. However, Comparative Example 2 does not only oxidize the $NH_3$ to the $N_2$ gas, but also oxidizes the $NH_3$ to the $N_2O$ or the NOx. Since the $N_2O$ or the NOx generated through the oxidation of the $NH_3$ should not be exhausted to the outside of the vehicle, a catalytic converter capable of purifying the $N_2O$ and the NOx must be disposed at the downstream of the CUC 60 when using the CUC 60 according to Comparative Example 2. Also, the $NH_3$ does not slip during a delay time T2 at the rich AFR, but the $O_2$ stored in the oxygen storage material of the CUC 60 is purged, and thus, the $NH_3$ begins to slip when the delay time T2 elapses. On the other hand, since the amount of the $CeO_2$ contained in Comparative Example 2 is larger than the amount of the $CeO_2$ contained in the Example 1, the delay time T2 is slightly longer than the delay time T1.

FIG. 14 is a block diagram of an after treatment system according to an form of the present disclosure.

FIG. 14 illustrates a simple example of inputs and outputs of the controller 90 to implement the after treatment system according to forms of the present disclosure. It should be understood that the inputs and the outputs of the controller 90 according to forms of the present disclosure are not limited to the example illustrated in FIG. 14.

As shown in FIG. 14, the controller 90 is electrically connected to the first and second oxygen sensors 32 and 34, the first and second temperature sensors 62 and a 64, and the air flowmeter 66, and receives the signals corresponding to the values detected by the sensors 32, 34, 62, 64 and 66.

The first oxygen sensor 32 detects the concentration of the $O_2$ contained in the exhaust gas at the upstream of the TWC 30 and transmits the signal corresponding thereto to the controller 90. The second oxygen sensor 34 detects the concentration of oxygen contained in the exhaust gas at the downstream of the TWC 30 and transmits the signal corresponding thereto to the controller 90. The controller 90 can determine whether the TWC 30 is operating normally based on the signals of the first and second oxygen sensors 32 and 34, and performs air/fuel ratio control of the engine 10.

The first temperature sensor 62 detects the temperature of the exhaust gas at the upstream of the SCR catalyst 50 and transmits the signal corresponding thereto to the controller 90. The second temperature sensor 64 detects the temperature of the exhaust gas at the downstream of the SCR catalyst 50 and transmits the signal corresponding thereto to the controller 90. The controller 90 can calculate the temperatures of the TWC 30, the particulate filter 40, the SCR catalyst 50, and the CUC 60 based on the signals of the first and second temperature sensors 62 and 64.

The air flowmeter 66 is mounted on an intake pipe or an intake duct to detect the amount of the air flowing into the intake system, and transmits the signal corresponding thereto to the controller 90.

The controller 90 controls operation of the engine 10 based on the values detected by the sensors 32, 34, 62, 64 and 66. That is, the controller 90 can adjust the fuel injection amount to adjust the target AFR, and can delay the ignition timing for warming up the catalysts 30, 40, 50 and 60.

FIG. 15 is a flowchart of an after treatment method according to an form of the present disclosure.

As shown in FIG. 15, when the engine 10 is started at step S110, the controller 90 calculates the temperatures of the catalysts 30, 40, 50 and 60. In order to carry out the after treatment method according to the form of the present disclosure, the catalysts 30, 40, 50 and 60 must be activated. Accordingly, the controller 90 warms up the catalysts 30, 40, 50 and 60 at step S120 if the catalysts 30, 40, 50 and 60 are not activated. That is, the ignition timing is delayed or the amount of the fuel injection is increased to increase the temperature of the exhaust gas.

When warming-up of the catalyst 30, 40, 50, and 60 is completed, the controller 90 operates the engine 10 at the lean AFR at step S130. Therefore, the TWC 30 purifies the CO and the HC contained in the exhaust gas and the particulate filter 40 collects the particulate matter contained in the exhaust gas.

The controller 90 calculates the amount of the $NH_3$ stored in the SCR catalyst 50 at step S140. That is, the amount of the $NH_3$ stored in the SCR catalyst 50 is calculated based on operation history of the engine 10, temperature history of the SCR catalyst 50, and the like.

Also, the controller 90 calculates the amount of NOx to be flowed into the SCR catalyst 50 at step S150. The amount of the NOx generated in the engine 10 is calculated based on a combustion state (e.g., a combustion temperature, a combustion pressure, the air amount, the fuel amount, etc.) of the engine 10, and the amount of the NOx slipped from the TWC 10 is calculated based on the AFR of the exhaust gas, the temperature of the TWC 30, etc.

Thereafter, the controller 90 determines whether the SCR catalyst 50 can purify the NOx at step S160. That is, it is determined whether the amount of the $NH_3$ stored in the SCR catalyst 50 is sufficient to purify the NOx flowing into the SCR catalyst 50.

If the SCR catalyst 50 can purify the NOx at the step S160, the controller 90 terminates the after treatment method according to the form of the present disclosure. In this case, the engine 10 is operated at the lean AFR.

If the SCR catalyst 50 is not capable of purifying the NOx (i.e., the amount of the $NH_3$ stored in the SCR catalyst 50 is not sufficient to purify the NOx flowing into the SCR catalyst 50) at the step S160, the controller 90 calculates the rich duration and the target AFR for generating the $NH_3$ at step S170. As mentioned earlier, the $NH_3$ begins to slip from the CUC 60 after the delay time T1 has elapsed at the rich AFR. Therefore, to reduce the amount of the $NH_3$ slipped from the CUC 60, it is desirable to increase the number of times to enter the rich AFR while reducing the rich duration. Thus, the rich duration can be calculated so that when the slip amount of the $NH_3$ accumulated at the downstream of the CUC 60 is below a predetermined value when the engine is operated for the rich duration at the target AFR. In addition, the target AFR can be set by a person of an ordinary skill in the art to improve the performance of the after treatment system while reducing fuel consumption. For example, the target AFR may be 0.97 that is slightly rich AFR, but is not limited thereto. Also, the amount of the NH3 slipped from the CUC 60 varies with the temperature of the CUC 60. Therefore, the rich duration can be calculated according to the target AFR and the temperature of the CUC 60. The rich duration may be equal to or slightly larger than the delay time T1 of the CUC 60.

When the rich duration and the target AFR are calculated at the step S170, the controller 90 operates the engine 10 at the target AFR for the rich duration at step S180. That is, by driving engine 10 at rich air/fuel ratio during rich duration, TWC 30 produces NH 3, while reducing the amount of CO and NH 3 slipped in CUC 60. That is, by driving the engine 10 at the rich AFR for the rich duration, the TWC 30 generates the $NH_3$ while reducing the amount of the CO and $NH_3$ slipped from the CUC 60.

After performing the step S180, the controller 90 returns to the step S130 and operates the engine 10 at the lean AFR. Even when the engine 10 is operated at the target AFR for the rich duration, the $NH_3$ generation may not be sufficient to purify the NOx that flows into the SCR catalyst 50 (e.g., the NOx amount that flows into the SCR catalyst 50 is greater than the amount of the NOx that can be purified by the $NH_3$ generation for the rich duration). Accordingly, the controller 90 operates the engine at the lean AFR for a predetermined time, and then performs the step S140 to the step S180 again. If the sufficient $NH_3$ is generated to purify the NOx flowing into the SCR catalyst 50, then the after treatment method will be terminated at the step S160.

While this disclosure has been described in connection with what is presently considered to be practical forms, it is to be understood that the disclosure is not limited, but, on the contrary, is intended to cover various modifications and equivalent arrangements included within the spirit and scope of the disclosure.

What is claimed is:

1. An after treatment system comprising:
   an exhaust pipe through which an exhaust gas flows;
   a three-way catalyst (TWC) mounted on the exhaust pipe, oxidizing HC and CO contained in the exhaust gas at a lean air/fuel ratio, and generating $NH_3$ using NOx contained in the exhaust gas at a rich air/fuel ratio;
   a selective catalytic reduction (SCR) catalyst mounted on the exhaust pipe at a downstream of the TWC, storing the $NH_3$ generated in the TWC, and reducing the NOx contained in the exhaust gas using the stored $NH_3$, and
   a CO clean-up catalyst (CUC) mounted on the exhaust pipe at a downstream of the SCR catalyst, purifying the $NH_3$ contained in the exhaust gas at the lean air/fuel ratio, purifying the CO slipped from the TWC or contained in the exhaust gas at the rich air/fuel ratio, and purifying the $NH_3$ contained in the exhaust gas during a delay time at the rich air/fuel ratio,
   further comprising an additional TWC or an ammonia production catalyst (APC) disposed between the TWC and the SCR catalyst,
   wherein the additional TWC or the APC further generates $NH_3$ using the NOx contained in the exhaust gas at the rich air/fuel ratio,
   wherein the APC includes 0.4-0.9 wt % of Pt, 0.057-0.3 wt % of Pd, 0.03-0.1 wt % of Rh, 5.0-15.0 wt % of Ba, 10-30 wt % of CeO2, 48.7-84.513 wt % of a composite of MgO and Al2O3, and 0-5 wt % of an additive based on a total weight of the APC.

2. The after treatment system of claim 1, further comprising a particulate filter disposed between the TWC and the SCR catalyst,
   wherein the particulate filter traps particulate matter in the exhaust gas.

3. An after treatment system comprising:
   an exhaust pipe through which an exhaust gas flows;
   a three-way catalyst (TWC) mounted on the exhaust pipe, oxidizing HC and CO contained in the exhaust gas at a lean air/fuel ratio, and generating $NH_3$ using NOx contained in the exhaust gas at a rich air/fuel ratio;
   a selective catalytic reduction (SCR) catalyst mounted on the exhaust pipe at a downstream of the TWC, storing the $NH_3$ generated in the TWC, and reducing the NOx contained in the exhaust gas using the stored $NH_3$; and
   a CO clean-up catalyst (CUC) mounted on the exhaust pipe at a downstream of the SCR catalyst, purifying the $NH_3$ contained in the exhaust gas at the lean air/fuel ratio, purifying the CO slipped from the TWC or contained in the exhaust gas at the rich air/fuel ratio, and purifying the $NH_3$ contained in the exhaust gas during a delay time at the rich air/fuel ratio,
   further comprising an additional TWC or an ammonia production catalyst (APC) disposed between the TWC and the SCR catalyst, wherein the additional TWC or the APC further generates NH$_3$ using the NOx contained in the exhaust gas at the rich air/fuel ratio, wherein the APC includes 0.4-0.9 wt % of Pt, 0.057-0.3 wt % of Pd, 0.03-0.1 wt % of Rh, 5.0-15.0 wt % of Ba, 10-25 wt % of CeO2, 48.7-79.513 wt % of a composite of MgO and Al$_2$O$_3$, and 0-10 wt % of an additive based on a total weight of the APC.

4. The after treatment system of claim 3, wherein a lean NOx trap (LNT) catalyst is further coated in the TWC or the additional TWC, and wherein the LNT catalyst absorbs the NOx contained in the exhaust gas at the lean air/fuel ratio, and releases and reduces the absorbed NOx into N2 gas or the NH$_3$ at the rich air/fuel ratio.

5. An after treatment system comprising:

an exhaust pipe through which an exhaust gas flows;

a three-way catalyst (TWC) mounted on the exhaust pipe, oxidizing HC and CO contained in the exhaust gas at a lean air/fuel ratio, and generating NH$_3$ using NOx contained in the exhaust gas at a rich air/fuel ratio;

a selective catalytic reduction (SCR) catalyst mounted on the exhaust pipe at a downstream of the TWC, storing the NH$_3$ generated in the TWC, and reducing the NOx contained in the exhaust gas using the stored NH$_3$;

and a CO clean-up catalyst (CUC) mounted on the exhaust pipe at a downstream of the SCR catalyst, purifying the NH$_3$ contained in the exhaust gas at the lean air/fuel ratio, purifying the CO slipped from the TWC or contained in the exhaust gas at the rich air/fuel ratio, and purifying the NH$_3$ contained in the exhaust gas during a delay time at the rich air/fuel ratio, wherein the CUC comprises a zeolite in which Cu and Fe are ion-exchanged and CeO2 in which Pt is supported, and wherein a weight ratio of the CeO2 to a total weight of the CUC is 30-70 wt %.

6. The after treatment system of claim 5, wherein the CUC comprises 0.04-0.4 wt % of the Pt, 0.2-1 wt % of the Cu, 0.2-1 wt % of the Fe, 20-50 wt % of the zeolite, 30-70 wt % of the CeO2, and 0-20 wt % of an additive based on the total weight of the CUC.

7. The after treatment system of claim 6, wherein the additive comprises at least one of La, Zr, Mg, and Pr.

8. The after treatment system of claim 5, wherein the CUC is formed by uniformly mixing the zeolite in which the Cu and the Fe are ion-exchanged and the CeO2 in which the Pt is supported.

9. The after treatment system of claim 5, wherein the zeolite in which the Cu and the Fe are ion-exchanged is disposed at a front end portion of the CUC and the CeO2 in which the Pt is supported is disposed at a rear end portion of the CUC in a direction to which the exhaust gas flows.

10. The after treatment system of claim 5, wherein the CUC is formed by stacking up the zeolite in which the Cu and the Fe are ion-exchanged and the CeO2 in which the Pt is supported in a vertical direction to which the exhaust gas flows.

\* \* \* \* \*